(12) United States Patent
Bangolae et al.

(10) Patent No.: US 7,447,206 B1
(45) Date of Patent: Nov. 4, 2008

(54) PVC SUITED FOR SUPPORTING USER APPLICATIONS WITH CHANGING REQUIREMENTS

(75) Inventors: Balaji Lakshmikanth Bangolae, Bangalore (IN); Hrishikesh Vishwas Kulkarni, Bangalore (IN); Pankaj Vyas, Bangalore (IN); Sudhakar Shenoy, Bangalore (IN); Amit S. Phadnis, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1239 days.

(21) Appl. No.: 10/193,999

(22) Filed: Jul. 15, 2002

(51) Int. Cl.
*H04L 12/28* (2006.01)
*H04L 12/56* (2006.01)

(52) U.S. Cl. ........................ 370/392; 370/236
(58) Field of Classification Search .................. None
See application file for complete search history.

(56) References Cited

U.S. PATENT DOCUMENTS

| | | | |
|---|---|---|---|
| 5,878,029 A * | 3/1999 | Hasegawa et al. | 370/236 |
| 6,657,958 B1 * | 12/2003 | Tanaka | 370/230.1 |
| 6,917,614 B1 * | 7/2005 | Laubach et al. | 370/392 |
| 6,977,898 B1 * | 12/2005 | Miriyala | 370/236 |
| 2002/0057694 A1 * | 5/2002 | Kamo | 370/395.2 |
| 2002/0089985 A1 * | 7/2002 | Wahl et al. | 370/395.1 |
| 2002/0191250 A1 * | 12/2002 | Graves et al. | 359/128 |

FOREIGN PATENT DOCUMENTS

JP 08204723 A * 8/1996

OTHER PUBLICATIONS

Machine translation of detailed description of JP 08204723 A.*
Translation of Abstract of JP 08204723 A.*
ITU-T Recommendation I.610 (Feb. 1999); Entitled:"Series I: Integrated Services Digital Network Maintenance principles; B-ISDN operation and maintenance principles and functions"; Available from www.atmforum.com ; (116 pages).
The ATM Forum Technical Committee; Entitled:"ATM User-Network Interface (UNI) Signalling Specification, Version 4.0"; af-sig-0061.000; Jul. 1996; Available from www.atmforum.com; (136 Pages).
The ATM Forum Technical Committee; Entitled:"Modification of Traffic Descriptor for an Active Connection Addendum to UNI 4.0 / PNNI 1.0 / AINI"; AF-CS-0148.000; Jul. 2000; Available from www.atmforum.com; (60 Pages).

* cited by examiner

*Primary Examiner*—Huy D. Vu
*Assistant Examiner*—Clemence Han
(74) *Attorney, Agent, or Firm*—Narendra Reddy Thappeta

(57) ABSTRACT

The services offered (e.g., bandwidth) by a PVC can be changed, potentially as and when desired. An end system (of a PVC) may send a request to initiate a change of a service. Each intermediate system may first determine whether the service change can be supported, and passes the request to the next system in the path until the request is received by the other end system of the PVC. Assuming the other end system also can support the change, an acceptance response is propagated in the reverse direction of the same path. Each system may effect the service change upon receiving the acceptance response.

54 Claims, 7 Drawing Sheets

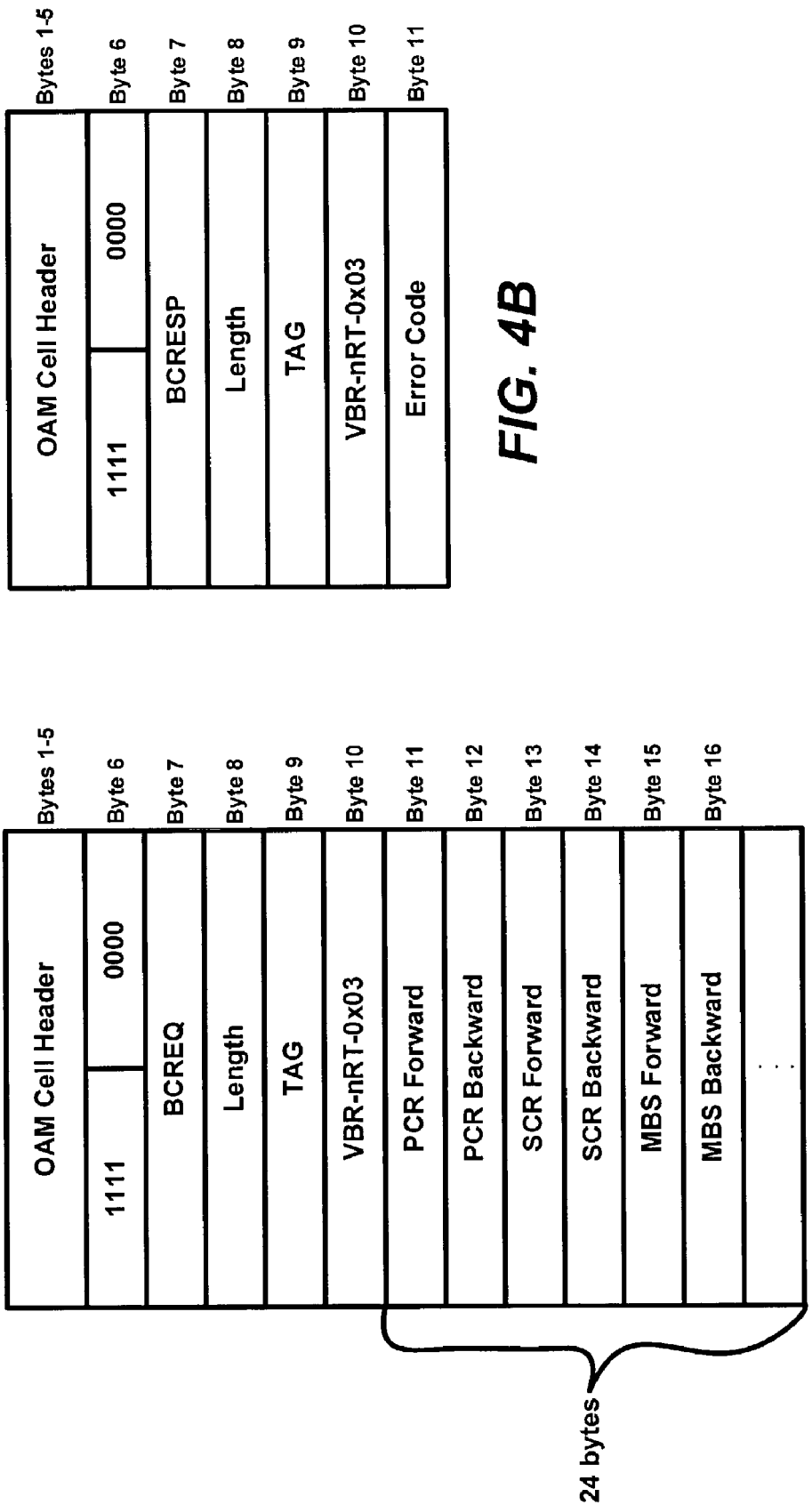

| Byte 1-5 | Byte 6 | Byte 7 | Byte 8 | Byte 9 | Byte 10 |
|---|---|---|---|---|---|
| OAM Cell Header | 1111 / 0000 | BCRELREQ | Length | TAG | VBR-nRT-0x03 |

*FIG. 4C*

| Byte 1-5 | Byte 6 | Byte 7 | Byte 8 | Byte 9 | Byte 10 |
|---|---|---|---|---|---|
| OAM Cell Header | 1111 / 0000 | BCRELRESP | Length | TAG | VBR-nRT-0x03 |

*FIG. 4D*

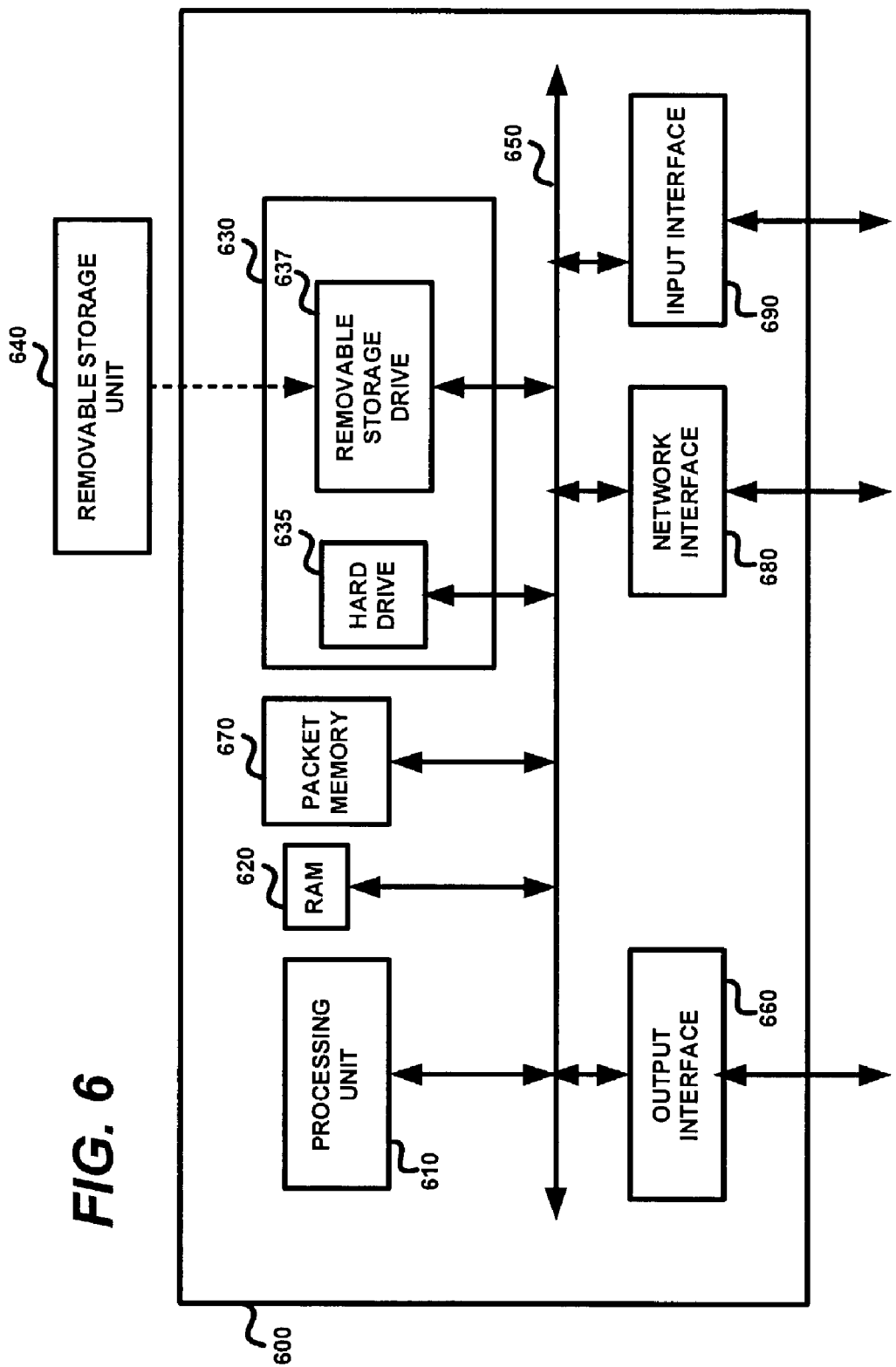

PVC SUITED FOR SUPPORTING USER APPLICATIONS WITH CHANGING REQUIREMENTS

BACKGROUND OF THE INVENTION

1. Field of the Invention

The present invention relates to telecommunication networks, and more specifically to a method and apparatus for providing a permanent virtual circuit (PVC) between end systems in an asynchronous transfer mode (ATM network).

2. Related Art

Virtual circuits are often provisioned between end systems. End systems refer to devices such as customer premise equipment (CPEs), edge routers and switches at which virtual circuits terminate. The end systems interface with user systems (e.g., personal computer systems) and enable communication (and thus applications) between the user systems as is well known in the relevant arts.

Virtual circuits may be provided in various forms. For example, a switched virtual circuit (SVC) may be provisioned between two end systems. In general, an SVC is set up when required and released after use. Due to such set up and release operations on an as required basis, the resources (e.g., available bandwidth, memory) available in a telecommunications network may be utilized optimally. However, one problem with SVCs is that the overhead associated with the signaling protocols in provisioning and releasing the SVCs may be unacceptably high.

Accordingly, a permanent virtual circuit (PVC) may be provisioned between two end systems. A PVC is generally provisioned once, and continues existence even when not in use. Accordingly, the signaling overhead on a network in terms of set up and release is avoided.

One problem with PVCs is that the services (e.g., bandwidth, latency) provided by each PVC is generally fixed. However, the user applications may require different services at different times. One solution to such a problem is to over-design PVCs such that each PVC is configured to provide the most demanding (e.g., highest required bandwidth, lowest required latency) services.

Such a solution may require each PVC be allocated the maximum necessary resources corresponding to the demanding of services. However, when the user applications do not require all of the allocated resources, the available resources may go under-utilized. The under-utilized resources may not be available for use by other virtual circuits, which may lead to sub-optimal performance and/or the solution not scaling to serve more virtual circuits. The solution may accordingly not be acceptable at least in some environments.

BRIEF DESCRIPTION OF THE DRAWINGS

The present invention will be described with reference to the accompanying drawings, wherein:

FIGS. 4A-4D respectively contain a packet format used for sending a request to change a service, a response to the request to change, a request to release a prior request to change a service and a response to release in an embodiment of the present invention;

FIG. 6 is a block diagram illustrating the details of an embodiment of customer premise equipment implemented substantially in the form of software according to an aspect of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

An aspect of the present invention enables services provided by a permanent virtual circuit (PVC) to be changed, potentially as and when necessary. The provided services generally affect the manner in which cells are processed, and include such attributes as bandwidth and other quality of services (QOS). Due to the change in the service offered on a PVC, the resources allocated to the PVC also can be accordingly increased or decreased. As a result, user applications may receive desired services when needed, and yet the resources available in a network may be efficiently used by various virtual circuits.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
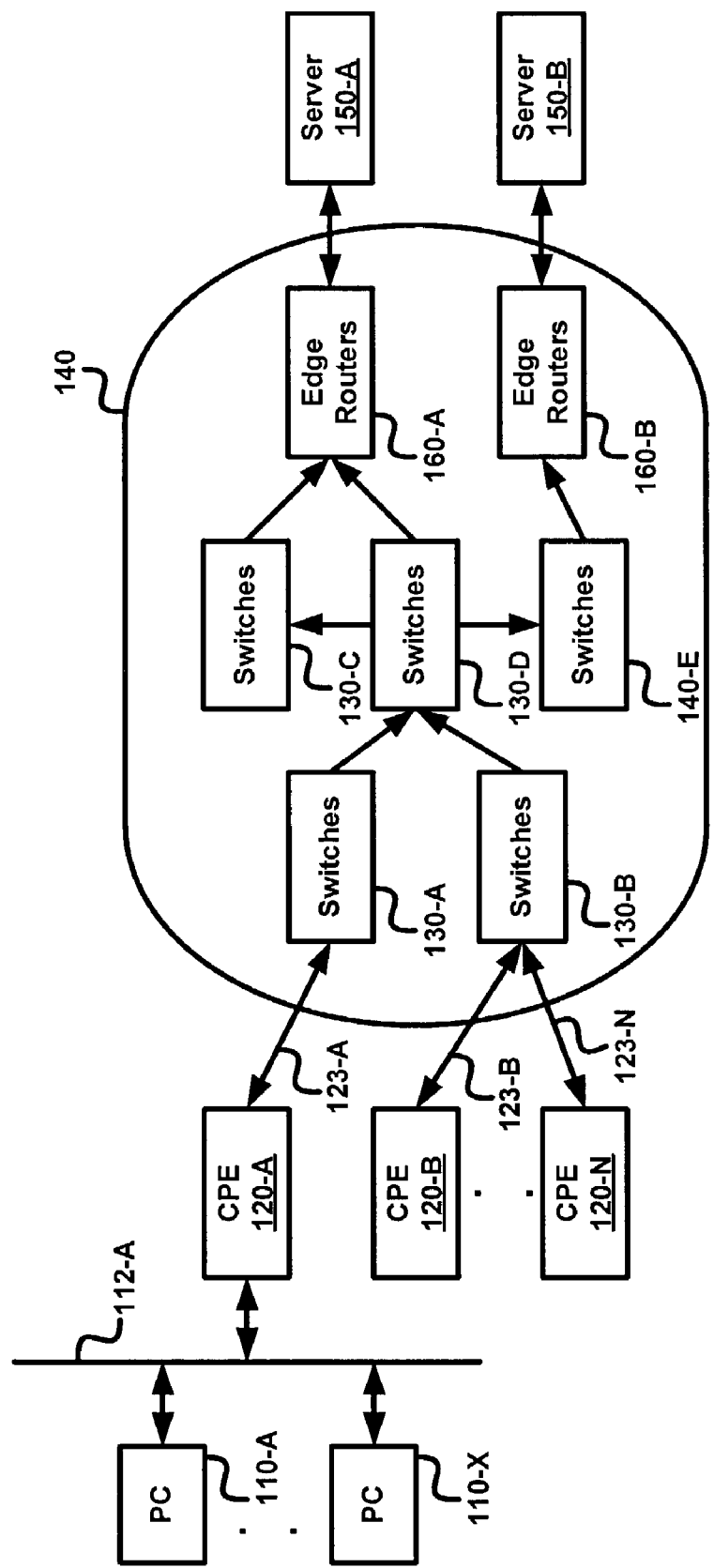
FIG. 1 is a block diagram illustrating an example environment in which the present invention can be implemented.

FIG. 1 is a block diagram illustrating an example environment in which the present invention can be implemented. The environment is shown containing personal computer (PC) systems 110-A through 110-X, customer premise equipments (CPE) 120-A through 120-N, telephone lines 123-A through 123-N, network 140, and servers 150-A and 150-B. Each component is described below in further detail.

The environment is shown containing a few representative components only for illustration. In reality, each environment typically contains many more components (of different types). CPEs 120-A through 120-N are described with reference to CPE 120-A only for conciseness. Similarly, telephone lines 123-A through 123-N are described with reference to telephone line 123-A.

PCs 110-A through 110-X access servers 150-A and 150-B using CPE 120-A and network 140. PCs 110-A through 110-X are examples of user systems, and are shown connected to CPE 120-A by a local area network (LAN) 112-A. The data transfers between PC 110-A and server 150-A enables user applications as is well known in the relevant arts.

CPE 120-A receives data packets transmitted by PC 110-A through 110-N, and forwards the contained data to network 140 on telephone line 123-A. Similarly, data received from network 140 is forwarded to the appropriate one of the PCs 110-A through 110-X. An embodiment of CPE 120-A is implemented using 800 series router product available from Cisco Systems Inc., the assignee of the subject patent application.

Network 140 is shown containing switches 130-A through 130-E, and edge routers 160-A and 160-B. The switches and routers (in conjunction with CPE 120-A) are used to provide virtual circuits enabling data transfers between PCs and servers. Some of the virtual circuits may be provided in the form of permanent virtual circuits (PVCs), and such provisioning may be performed in a known way.

The present invention enables the services offered by the PVCs to be modified dynamically as described below with several examples. By enabling the dynamic modification of the services offered by PVCs, the resources available in various switches and routers of the network may be utilized efficiently while providing desired services to the user applications.

3. Method

Figure 2:
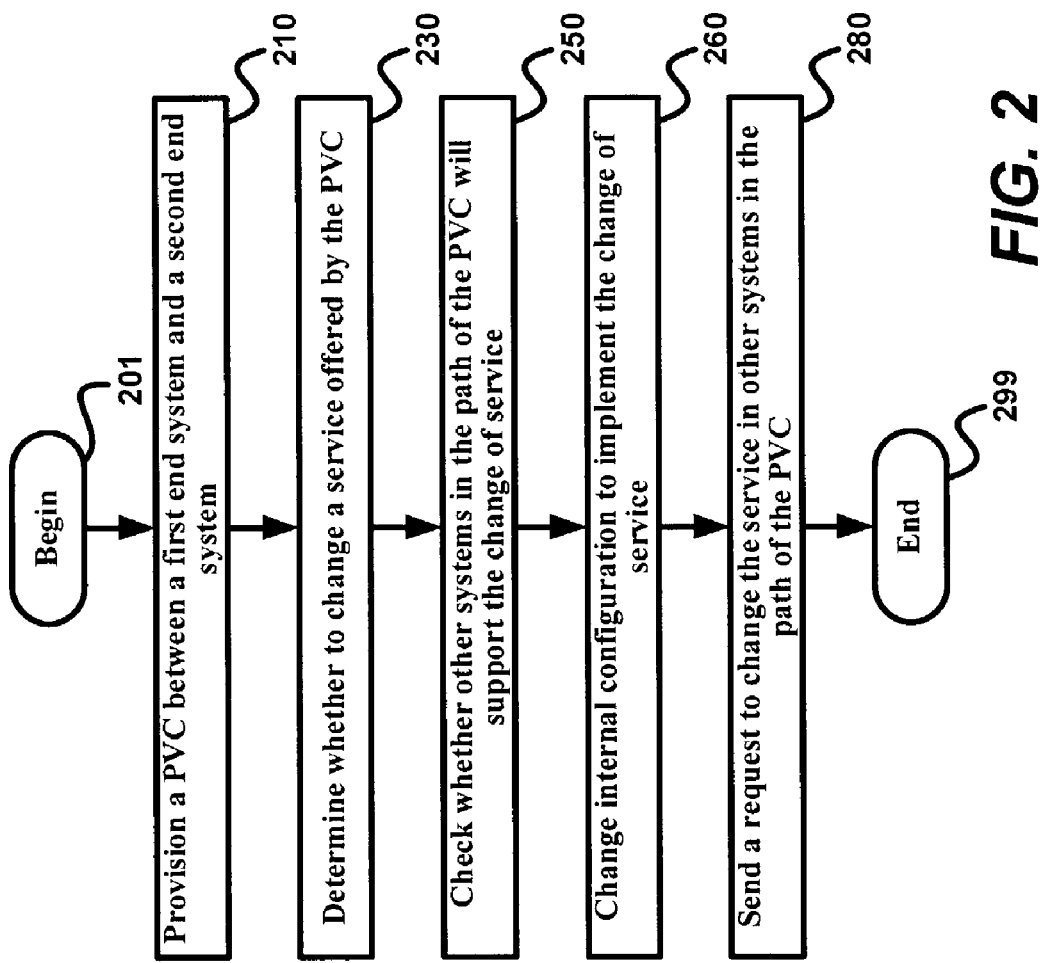
FIG. 2 is a flow chart illustrating a method using which a system may initiate and effect a change in a service provided by a PVC in an embodiment of the present invention.

FIG. 2 is a flow-chart illustrating a method using which the services offered by a PVC may be changed by an end system. The method is described below with reference to CPE 120-A of FIG. 1 for illustration. However, the method may be implemented in other end systems (to a PVC) as well. The method begins in step 201, in which control immediately passes to step 210.

In step 210, a PVC is provisioned between two end systems. For illustration, the PVC is assumed to be provisioned between CPE 120-A and edge router 160-A. As may be readily appreciate, the PVC would be provisioned with various services (bandwidth, latency), and such provisioning may be performed in a known way.

In step 230, a determination is made as to whether to change the service offered by a PVC. Examples of services that may be changed include bandwidth, QOS parameters, congestion notification and (alternative) routes. In an embodiment, the determination is based on whether the such changes are permissible within the end system (e.g., as specified by user configuration) and, if permissible, the necessary resources are available within the end system.

The determination may be made in response to several events. For example, a request may be received from an administrator to change the services. Alternatively, CPE 120-A (or a network management station, not shown) may be implemented to monitor various parameters (e.g., cell drop count, buffer utilization, bandwidth utilization, etc.), and to determine whether to change the services presently offered by the PVC.

In step 250, (assuming that a determination is made to change the services) CPE 120-A checks whether other systems in the path of the PVC will support change of the service(s) on the PVC. In general, checking entails sending a request indicating that a change of the service(s) is sought, and receiving a response. Several communications can potentially occur between the request and the response.

The response indicates whether the other systems will support a change of the service(s). In an embodiment described below, the response indicates whether the change has been implemented by all the other systems in the PVC path. An example protocol according to which the request and response may operate is described in a section below.

In step 260, the internal configuration of CPE 120-A is changed to implement the change of service(s). The changes generally need to be implemented consistent with the design of CPE 120-A in providing the corresponding service(s) to the user applications.

Thus, the method of above enables an end system of a PVC to change a service associated with the PVC. However, the other switches/routers in the path of the PVC generally need to cooperate with the implementation of the service change. Some of the implementation considerations in some example embodiments are described below.

4. Cooperation from Other Systems in the Path of the PVC

Figure 3:
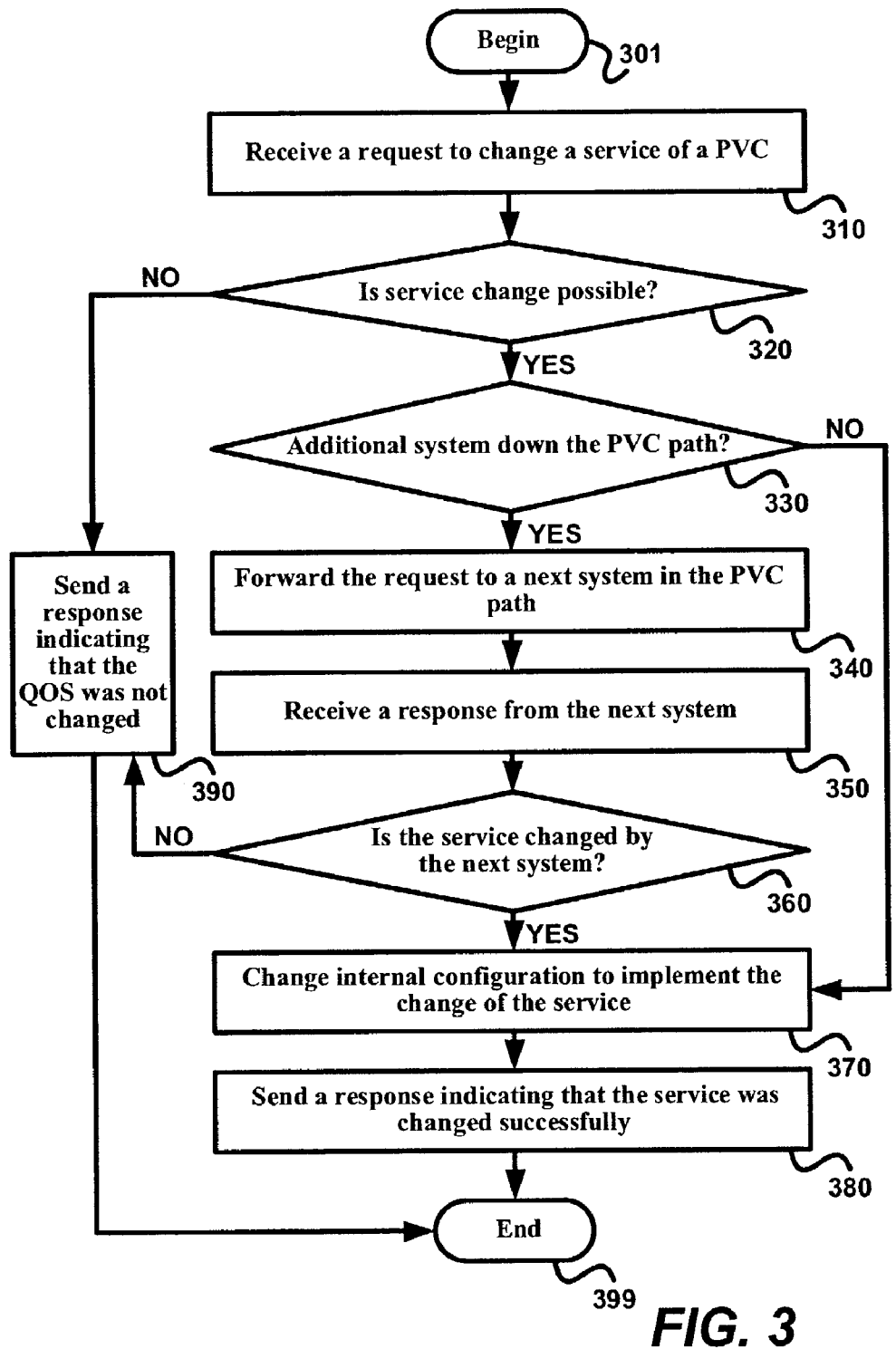
FIG. 3 is a block diagram illustrating the manner in which the other systems in the path of a PVC may need to operate to support a change of a service provided by a PVC in an embodiment of the present invention.

FIG. 3 is a flow-chart illustrating the steps that may need to be performed by systems (other than the end system initiating the change of service) in the path of a PVC. The method is described with respect to a PVC in which switches 130-A and 130-D, and edge router 160-A (in that sequence) are in the path of a PVC originating at CPE 120-A. However, the method can be implemented with other PVCs and associated other systems. The method begins in step 301 in which control immediately passes to step 310.

In step 310, a system (e.g., switch 130-A) receive a request to change a service of a PVC from a prior system (CPE 120-A). In step 320, the system determines whether the service can be changed. In an embodiment, the determination is based on whether such a change is permissible within the system (e.g., as specified by user configuration) and, if permissible, whether the necessary resources are available within the end system. If the service can be changed, control passes to step 330 or else control passes to step 390.

In step 330, the system determines whether an additional system is present further down the PVC path. The determination can be made by examining internal tables used to forward cells. In general, there would not be such additional systems for an end system (edge router 160-A in the illustrative PVC) to a PVC, and an additional system would be present for the intermediate systems (switches 130-A and 130-D). Control passes to step 340 if there is an additional system, and to step 370 otherwise.

In step 340, the request is forwarded to the next system in the PVC path. In general, the VPI/VCI in the incoming cell is mapped to another VPI/VCI, and the mapped VPI/VCI is used to construct a new cell. The new cell contains the request to be forwarded. Assuming that a PVC path contains CPE 120-A, switches 130-A and 130-D and edge router 160-A, and that a request to change service originates at CPE 120-A, it may be noted that switch 130-A and edge router 160-A are respectively referred to as previous and next system for a present system 130-D.

In step 350, a response is received from the next system. The response indicates whether the next system has indeed changed the service. Thus, in step 360, the response is examined to determine whether the service has been changed. Control passes to step 370 if the service has been changed, and to step 390 otherwise.

In step 370, the internal configuration of the system is changed to implement the change in the service, as requested. In step 380, a response is sent indicating that the service was changed successfully. In step 390, a response is sent indicating that the service was not changed. From both steps 380 and 390, control passes to step 399, in which control ends. Thus, the methods of FIGS. 2 and 3 can be used to implement changes to service (services) offered by a PVC.

As may be appreciated from the above, the requests and responses may need to be generated according to a pre-specified format/protocol. Accordingly, the description is continued with reference to example cell format.

5. Example Cell Format

In an embodiment, the protocol is implemented within the framework of OAM (operation, administration and maintenance) cells generally supported in ATM networks. An example format of OAM cells to implement various bandwidth management operations is described below in further detail for illustration. However, the packet format can be extended to implement other service changes as well, as will be apparent to one skilled in the relevant arts based on the disclosure provided herein. Such changes are also contemplated to be within the scope and spirit of various aspects of the present invention.

The format of the OAM cells as applicable to bandwidth management operations is broadly noted below:

A. Payload Type Field (bits 2-4 of byte 4 in ATM header): 100 to indicate the OAM segment loopback cells, however other type of OAM cells can be used;

B. OAM Type Field (bits 5-8 of byte 6): Value 1111 to indicate usage for service changes; and C. Operation Type Field (bits 1-4 of byte 6): 0000 indicates bandwidth management.

Broadly, four operations may be used for bandwidth management: (1) bandwidth change request; (2) bandwidth change response; (3) bandwidth change release request; and (4) bandwidth change release response. The four operations and the associated packet format are described below in further detail.

With respect to (1) bandwidth change request, a bandwidth change request packet requests the change of the bandwidth for the PVC and the associated example format is depicted in FIG. 4A. The BCREQ value (e.g., 00) in byte 7 indicates that the OAM cell contains a request to change the bandwidth of the PVC on which the OAM cell is being transmitted. The length field (in byte 8) indicates the length of the request. The tag field in byte 9 contains a unique identifier for the request. Byte 10 indicates that the request is to change the PVC to VBR-nRT (variable bit rate-non real time) service. Assuming the PVC is a two way virtual circuit, the values of various parameters related to 2-way VBR_PVC are included in the fields corresponding to various parameter from byte 11 onwards.

With respect to (2) bandwidth change response, the response indicates whether the request to change the bandwidth has been processed. The corresponding packet format is depicted in FIG. 4B. Only the fields not already described, are described below for conciseness. A value of BCRESP (e.g., 01) in byte 7 indicates that a received cell contains a response. The value in the tag field may be used to associate a received response with a previously sent request. The error code field indicates whether the request was successfully processed by subsequent switches/routers in the path or not.

With respect to (3) bandwidth change release request, the release request is used to cancel a previously sent bandwidth change request. The release request may be used, for example, after not receiving a response to a previously sent request within a pre-specified duration. The corresponding packet format is shown in FIG. 4C. A value of BCRELREQ (e.g., 02) identifies the OAM bandwidth management cell as containing a release request. The value in the tag field is used to identify the specific prior request presently being canceled.

With respect to (4) bandwidth change release response, the release response is generated in response to bandwidth change release request. A value of BCRELRESP (e.g., 03) indicates that a received cell represents bandwidth change release response. The release response indicates whether the previously sent release request has been successfully processed. The corresponding packet format is shown in FIG. 4D.

While the packet format of above is described within the framework of OAM cells, it should be understood that alternative approaches can be used without departing from the scope and spirit of various aspects of the present invention. For example, a control PVC (e.g., with VPI/VCI=0/31) may be used to indicate the requests and responses. The corresponding approach may be referred to as an out-of-band approach in that a different PVC is being used to manage several PVCs.

In addition to the specific information/parameters related to change of service, the corresponding cells may specify the specific PVC (e.g., with VPI and VCI) sought to be changed. The implementation of such a protocol/format using the control PVC will be apparent to one skilled in the art by reading the disclosure provided herein, and such implementations are contemplated to be within the scope and spirit of various aspects of the present invention.

Thus, using the cell formats and methods described above, the service of a PVC may be changed dynamically as needed, according to various aspects of the present invention. The description is continued with reference to the manner in which the end systems and intermediate systems can be implemented in further detail.

6. Systems

Figure 5:
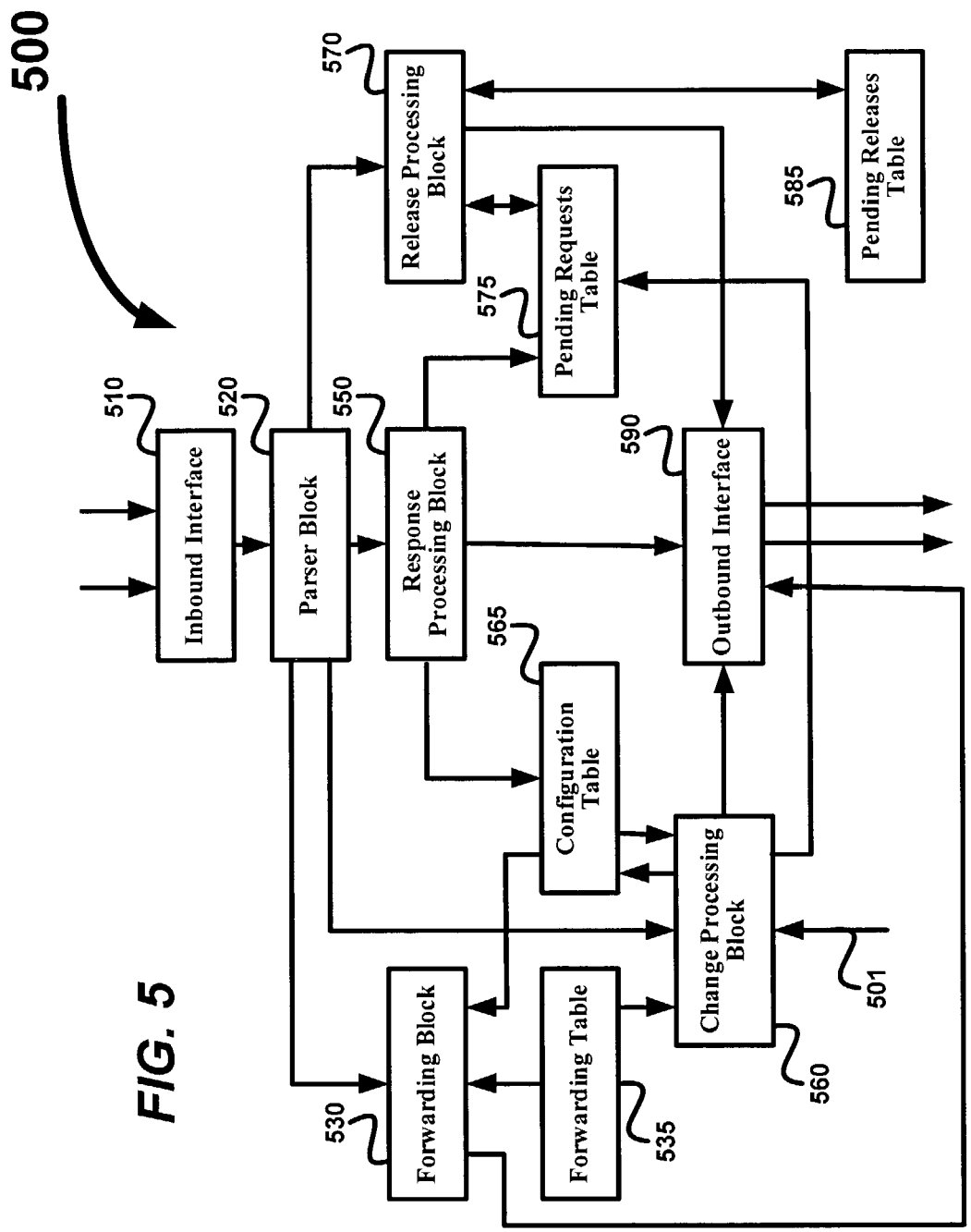
FIG. 5 is a block diagram of a system in an embodiment of the present invention.

FIG. 5 is a block diagram illustrating the details of system 500 in an embodiment of the present invention. System 500 may operate as any of the three types of systems, i.e., CPE 120-A, switches 130-A through 130-E, and edge routers 160-A and 160-B. When system 500 is adapted for a specific type of the three systems, the unnecessary components may be removed. In addition, only the components as necessary for an understanding of the described embodiments are shown contained in FIG. 5.

System 500 is shown containing inbound interface 510, parser block 520, forwarding block 530, response processing block 550, change processing block 560, release processing block 570, and outbound interface 590. Each component is described below in further detail.

Inbound interface 510 provides the physical, electrical and protocol interface to receive ATM cells (and IP packets in the case of edge routers and CPEs) from the other systems using ATM technology. The received packets are forwarded to parser 520 for further processing. Similarly, outbound interface 590 also provides the physical, electrical and protocol interface to receive ATM cells (and IP packets in the case of edge routers and CPEs). Inbound interface 510 and outbound interface 590 may be implemented in a known way.

Parser 520 examines the header/content of the received cells to determine the manner in which each cell is to be processed further. If a cell merely contains data for further forwarding, the cell is forwarded to forwarding block 530. If a cell contains a request to change a service offered by a PVC, the cell is forwarded to change processing block 560. If a cell contains a response to a previously sent request (to change a service), the cell is passed to response processing block 550. If a cell relates to bandwidth releases (request or response), the cell is forwarded to release processing block 570.

Forwarding table 535 contains the information necessary to forward the data contained in received cells/packets. In the case of edge routers, the VPI/VCI information is mapped to IP addresses, and vice versa. On the other hand, in the case of switches and the CPEs, forwarding table 535 provides data to map the VPI/VCI in the incoming direction to another VPI/VCI in the outgoing direction.

Forwarding table 535 may further store the various parameters that determine the services offered by the PVCs. The information may further specify whether system 500 is the last system in the PVC path. The information in forwarding table 535 may be populated and used in a known way.

Forwarding block 530 forwards the data in the received cells according to the information in forwarding table 535. If system 500 corresponds to an edge router (or CPE 120-A), the data in a received IP packet may need to be fragmented and sent in the form of several cells, and vice versa. The services offered in forwarding the ATM cells may depend on the data in forwarding table 535 and/or configuration table 565. The manner in which the services offered by PVCs can be changed is described below in further detail.

First the remaining tables used by different blocks are briefly described. The manner in which the tables are used is then described. Configuration table 565 may contain data indicating the specific parameters that may be changed for each PVC. For example, an administrator may set a maximum bandwidth (or maximum increments) permissible for some or specific PVCs.

Pending requests table 575 specifies the specific requests (forwarded/sent by system 500), which have not yet received corresponding responses from the system further down the PVC path. Pending releases table 585 specifies the specific bandwidth release requests (forwarded/sent by system 500), which have not yet received corresponding responses. The manner in which the information in the tables is used is described below.

Change processing block 560 processes the change service requests. Change processing block 560 examines configuration table 565, forwarding table 535 and any other information/registers to determine whether to accept the change request. The implementation of change processing block 560 depends on the specific service changes sought to be implemented.

For example, with reference to bandwidth management noted above, change processing block 560 may first examine configuration table 565 to determine whether the bandwidth can be changed for the specific PVC, and any maximum limits on bandwidth for the same PVC. The availability of necessary resources (e.g., amount of buffer space needed) is determined, and a decision is made to accept the request to increase the bandwidth if such increase is not inconsistent with the bandwidth allocation policy.

The change is then effected at an appropriate time. Effecting the change also depends on the specific service sought to be changed. In an embodiment, the change is effected immediately only when system 500 is a last system in the path of the PVC. Otherwise, an entry (containing information on the change to be effected) is created in pending requests table 575, which indicates that the change is to be effected after receiving a corresponding response.

With reference to the packet format of FIG. 4A, the information stored in pending requests table 575 may include the tags included in both the received and forwarded response. The tag in the receive request is used when sending back a corresponding response. Similarly, the tag in the forwarded request is used to correlate with the corresponding response to be received later.

It is noted that some of the requests ("locally originating requests") may originate locally within system 500 and some are received from parser 510. Some of the local originating requests may be in response to an administrator requesting a change of the service, and the corresponding inputs may be received on path 501.

Change processing block 560 uses the VPI/VCI (of a cell containing an external request) and forwarding table 535 to determine whether the cell needs to be forwarded further. In case the external request is to be forwarded, the VPI/VCI to be used for further forwarding is also determined based on a lookup of forwarding table 535. Change processing block 560 constructs a cell (containing the request to be forwarded) using the determined VPI/VCI and use outbound interface 590 to forward the cell.

Response processing block 550 processes responses received from a subsequent system in the PVC path. The tag in each received response may be examined to match with the specific pending request in pending requests table 575. If a response indicates that the subsequent system has accepted (implemented) the request to change the service, response processing block 550 may also effect the same change.

Once the change is effected, the response is forwarded to the prior system (if one exists) in the PVC path (i.e., in the direction of CPE 120-A assuming the request originated from CPE 120-A). A received response is forwarded even if the received response indicates that the subsequent system did not accept the change. Once a response sent, the corresponding entry may be deleted from pending requests table 575. It may be appreciated that the last end system in a PVC path may not need response processing block 550.

Release processing block 570 examines the entries in pending requests table 575 to determine whether responses are not received from any requests within a pre-specified time. Assuming some error condition in the subsequent systems of the path, release processing block 570 may send a bandwidth (or service) change release request (e.g., using the format of FIG. 4C) to the next system, and place an entry in pending releases table 585. Release processing block 570 may further send a response to the prior system with the appropriate error code indicating that the change has not been accepted. In addition, the corresponding entry may be removed from pending requests table 575.

Release processing block 570 processes the (service change) release requests and responses received from other systems as well. With respect to processing of release requests, the corresponding entry (identified by matching tags) in the pending requests table 575 may be marked as invalid (or immediately deleted) such that the change is not effected even if a response is received later. If a release response is received, the corresponding entry may be removed from pending releases table 585, and the response may be forwarded to the previous system in the PVC path. If a release response is not received in a pre-specified time (as determined based on pending releases table 585), an error condition may be reported.

Thus, using the approaches described above, end systems and intermediate systems in a PVC can be implemented to change the service offered by a PVC. It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing the systems with a desired mix of hardware, software and/or firmware. An embodiment implemented substantially in software is described below.

7. Software Implementation

FIG. 6 is a block diagram illustrating the details of system 600 in one embodiment. Similar to in FIG. 5, system 600 may operate as any of the three types of systems, i.e., CPE 120-A, switches 130-A through 130-E, and edge routers 160-A and 160-B. System 600 is shown containing processing unit 610, random access memory (RAM) 620, storage 630, output interface 660, packet memory 670, network interface 680 and input interface 690. Each component is described in further detail below.

Output interface 660 provides output signals (e.g., display signals to a display unit, not shown) which can form the basis for a suitable user interface for an administrator (configuring system 600) to interact with system 600. Input interface 690 (e.g., interface with a key-board and/or mouse, not shown) enables an administrator to provide any necessary inputs to system 600. For example, using input interface 690 and output interface 360, an administrator may specify that the specific service (e.g., bandwidth) of a PVC be changed.

Network interface 680 enables system 600 to send and receive data on communication networks using asynchronous transfer mode (ATM) and/or internet protocol (IP) as appropriate for the specific type of system. Network interface 680, output interface 660 and input interface 690 can be implemented in a known way.

RAM 620, storage 630, and packet memory 670 may together be referred to as a memory. RAM 620 receives instructions and data on path 650 from storage 630, and provides the instructions to processing unit 610 for execution. Packet memory 670 stores (queues) cells/packets waiting to be forwarded (or otherwise processed) on different ports.

Secondary memory 630 may contain units such as hard drive 635 and removable storage drive 637. Secondary storage 630 may store the software instructions and data, which enable System 600 to provide several features in accordance with the present invention.

Some or all of the data and instructions may be provided on removable storage unit 640, and the data and instructions may be read and provided by removable storage drive 637 to processing unit 610. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for memory/queue management). The special purpose processors may also be provided instructions from RAM 620.

In general processing unit 610 reads sequences of instructions from various types of memory medium (including RAM 620, storage 630 and removable storage unit 640), and executes the instructions to provide various features of the present invention. In particular, the execution causes the services offered by PVCs to be changed any time after the PVCs are provisioned. Due to the ability to change the services, the resources available in a network may be utilized efficiently.

8. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting a permanent virtual circuit (PVC) in an ATM network, said method being implemented in a present system contained in a sequence of systems in a path of said PVC, said method comprising:
   sending a request from said present system to a next system, wherein said request specifies a change of a service provided by said PVC, and wherein said next system is comprised in said sequence of systems;
   receiving a response from said next system, wherein said response indicates that said next system has accepted said request;
   configuring said present system to effect said change of said service; and
   generating a release change request if said response is not received upon occurrence of an event.

2. The method of claim 1, wherein said event comprises elapsing of a pre-specified time duration after said sending.

3. The method of claim 2, wherein said present system comprises a system originating said request.

4. The method of claim 3, wherein said system originating said request comprises an end system of said PVC.

5. The method of claim 2, wherein said present system comprises an intermediate system.

6. The method of claim 5, further comprising receiving said request from a prior system in said path of said PVC, and wherein said sending comprises forwarding said request.

7. The method of claim 6, further comprising determining whether to change said service, wherein said determining is performed prior to said sending, and said configuring is performed after said receiving.

8. The method of claim 7, further comprising maintaining a pending requests table which indicates a plurality of pending requests sent to a corresponding next system, but have not yet received corresponding responses.

9. The method of claim 1, wherein said service comprises a bandwidth of said PVC, wherein said configuring causes said bandwidth of said PVC to be changed.

10. The method of claim 9, further comprising determining whether to change said service, wherein said configuring is performed only if said determining determines to change said service.

11. The method of claim 10, wherein said determining comprises examining a table which specifies whether said service can be changed.

12. The method of claim 11, wherein said determining comprises checking whether said change in said bandwidth is permitted by a bandwidth allocation policy implemented in said present system.

13. The method of claim 12, wherein said request and said response are each sent in a corresponding OAM cell.

14. A computer readable medium carrying one or more sequences of instructions for causing a present system to support a permanent virtual circuit (PVC) in an ATM network, said present system being contained in a sequence of systems in a path of said PVC, wherein execution of said one or more sequences of instructions by one or more processors contained in said system causes said one or more processors to perform the actions of:
   sending a request from said present system to a next system, wherein said request specifies a change of a service provided by said PVC, and wherein said next system is comprised in said sequence of systems;

receiving a response from said next system, wherein said response indicates that said next system has accepted said request;

configuring said present system to effect said change of said service; and generating a release change request if said response is not received upon occurrence of an event.

15. The computer readable medium of claim 14, wherein said event comprises elapsing of a pre-specified time duration after said sending.

16. The computer readable medium of claim 15, wherein said present system comprises a system originating said request.

17. The computer readable medium of claim 16, wherein said system originating said request comprises an end system of said PVC.

18. The computer readable medium of claim 15, wherein said present system comprises an intermediate system, and wherein said request and said response are contained in an OAM cell.

19. The computer readable medium of claim 18, further comprising receiving said request from a prior system in said path of said PVC, and wherein said sending comprises forwarding said request.

20. The computer readable medium of claim 19, further comprising determining whether to change said service, wherein said determining is performed prior to said sending, and said configuring is performed after said receiving.

21. The computer readable medium of claim 20, further comprising maintaining a pending requests table which indicates a plurality of pending requests sent to a corresponding next system, but have not yet received corresponding responses.

22. The computer readable medium of claim 14, wherein said service comprises a bandwidth of said PVC, wherein said configuring causes said bandwidth of said PVC to be changed.

23. The computer readable medium of claim 22, further comprising determining whether to change said service, wherein said configuring is performed only if said determining determines to change said service.

24. The computer readable medium of claim 23, wherein said determining comprises examining a table which specifies whether said service can be changed.

25. The computer readable medium of claim 24, wherein said determining comprises checking whether said change in said bandwidth is permitted by a bandwidth allocation policy implemented in said present system.

26. The computer readable medium of claim 25, wherein said request and said response are each sent in a corresponding OAM cell.

27. A present system for supporting a permanent virtual circuit (PVC) in an ATM network, said present system being contained in a sequence of systems in a path of said PVC, said present system comprising:

means for sending a request from said present system to a next system, wherein said request specifies a change of a service provided by said PVC, and wherein said next system is comprised in said sequence of systems;

means for receiving a response from said next system, wherein said response indicates that said next system has accepted said request;

means for configuring said present system to effect said change of said service; and means for generating a release change request if said response is not received upon occurrence of an event.

28. The present system of claim 27, wherein said event comprises elapsing of a pre-specified time duration after said sending.

29. The present system of claim 28, wherein said present system comprises a system originating said request.

30. The present system of claim 29, wherein said system originating said request comprises an end system of said PVC.

31. The present system of claim 28, wherein said present system comprises an intermediate system.

32. The present system of claim 31, further comprising means for receiving said request from a prior system in said path of said PVC, and wherein said means for sending forwards said request.

33. The present system of claim 32, wherein said request and said response are contained in an operation, administration and maintenance (OAM) cell.

34. The present system of claim 33, further comprising maintaining a pending requests table which indicates a plurality of pending requests sent to a corresponding next system, but have not yet received corresponding responses.

35. The present system of claim 27, wherein said service comprises a bandwidth of said PVC, wherein said means for configuring causes said bandwidth of said PVC to be changed.

36. The present system of claim 35, further comprising means for determining whether to change said service, wherein said means for configuring is operative to perform said configuring only if said determining determines to change said service.

37. The present system of claim 36, wherein said means for determining is designed to examine a table which specifies whether said service can be changed.

38. The present system of claim 37, wherein said means for determining is designed to check whether said change in said bandwidth is permitted by a bandwidth allocation policy implemented in said present system.

39. The present system of claim 38, wherein said request and said response are each sent in a corresponding OAM cell.

40. The present system of claim 27, wherein said service comprises a bandwidth of said PVC, wherein said change processing block is designed to cause said bandwidth of said PVC to be changed.

41. The present system of claim 27, wherein said change processing block is designed to determine whether to change said service, wherein said change processing block effects said change only after determining to change said first QoS service.

42. The present system of claim 41, wherein said change processing block is designed to examine a table which specifies whether said service can be changed.

43. The present system of claim 42, wherein said change processing block is designed to check whether said change in said bandwidth is permitted by a bandwidth allocation policy.

44. The present system of claim 41, wherein said request and said response are each sent in a corresponding OAM cell.

45. A present system for supporting a permanent virtual circuit (PVC) in an ATM network, said present system being contained in a sequence of systems in a path of said PVC, said present system comprising:

an outbound interface to send a request from said present system to a next system, wherein said request specifies a change of a service provided by said PVC, and wherein said next system is comprised in said sequence of systems;

an inbound interface to receive a response from said next system, wherein said response indicates that said next system has accepted said request;

a change processing block to configure said present system to effect said change of said service; and a release request block to generate a release change request if said response is not received upon occurrence of an event.

46. The present system of claim 45, wherein said event comprises elapsing of a pre-specified time duration after said sending.

47. The present system of claim 46, wherein said present system comprises a system originating said request.

48. The present system of claim 47, wherein said system originating said request comprises an end system of said PVC.

49. The present system of claim 46, wherein said present system comprises an intermediate system.

50. The present system of claim 49, wherein said change processing block receives said request from a prior system in said path of said PVC sending forwards said request to a next system in said path.

51. The present system of claim 50, wherein said change processing block first determines whether to effect said change and then sends said request, wherein said change processing block effects said change after receiving said response.

52. The present system of claim 51, further comprising a memory storing a pending requests table which indicates a plurality of pending requests sent to corresponding next systems, but have not yet received corresponding responses.

53. The present system of claim 50, wherein said request and said response are contained in an operation, administration and maintenance (OAM) cell.

54. The present system of claim 53, wherein each of said request and said response contain a tag to uniquely identify said response associated with said request.

\* \* \* \* \*